United States Patent [19]
Stoakes

[11] 3,992,711
[45] Nov. 16, 1976

[54] FIRST AND FOURTH HARMONIC SYSTEM
[75] Inventor: William L. Stoakes, Fort Wayne, Ind.
[73] Assignee: International Telephone and Telegraph Corporation, Nutley, N.J.
[22] Filed: Oct. 4, 1956
[21] Appl. No.: 613,988

[52] U.S. Cl. .............................. 343/17.5; 343/12 R; 343/14; 343/17.2 R
[51] Int. Cl.² .......................................... G01S 9/38
[58] Field of Search ............... 343/12, 14, 11, 17.2, 343/17.5

[56] References Cited
UNITED STATES PATENTS

| | | | |
|---|---|---|---|
| 2,407,287 | 9/1946 | Labin .................................. | 343/103 |
| 2,408,048 | 9/1946 | Deloraine .......................... | 343/103 |
| 2,426,204 | 8/1947 | Grieg ................................. | 343/103 |
| 2,453,169 | 11/1948 | Varian ................................. | 343/14 |
| 2,931,030 | 3/1960 | Rey ...................................... | 343/14 |

*Primary Examiner*—Malcolm F. Hubler
*Attorney, Agent, or Firm*—John T. O'Halloran; Peter Van Der Sluys

EXEMPLARY CLAIM

3. A radar system comprising a continuous wave transmitter which transmits a carrier frequency signal, a relatively low frequency source coupled to the transmitter for phase modulating the carrier signal, a receiver for receiving an echo signal and coupled to said transmitter, said receiver including a mixer for beating the echo signal with the carrier signal, means for separating and selectively amplifying the first and fourth harmonic components of the mixer output signal, and means for comparing said components.

4 Claims, 2 Drawing Figures

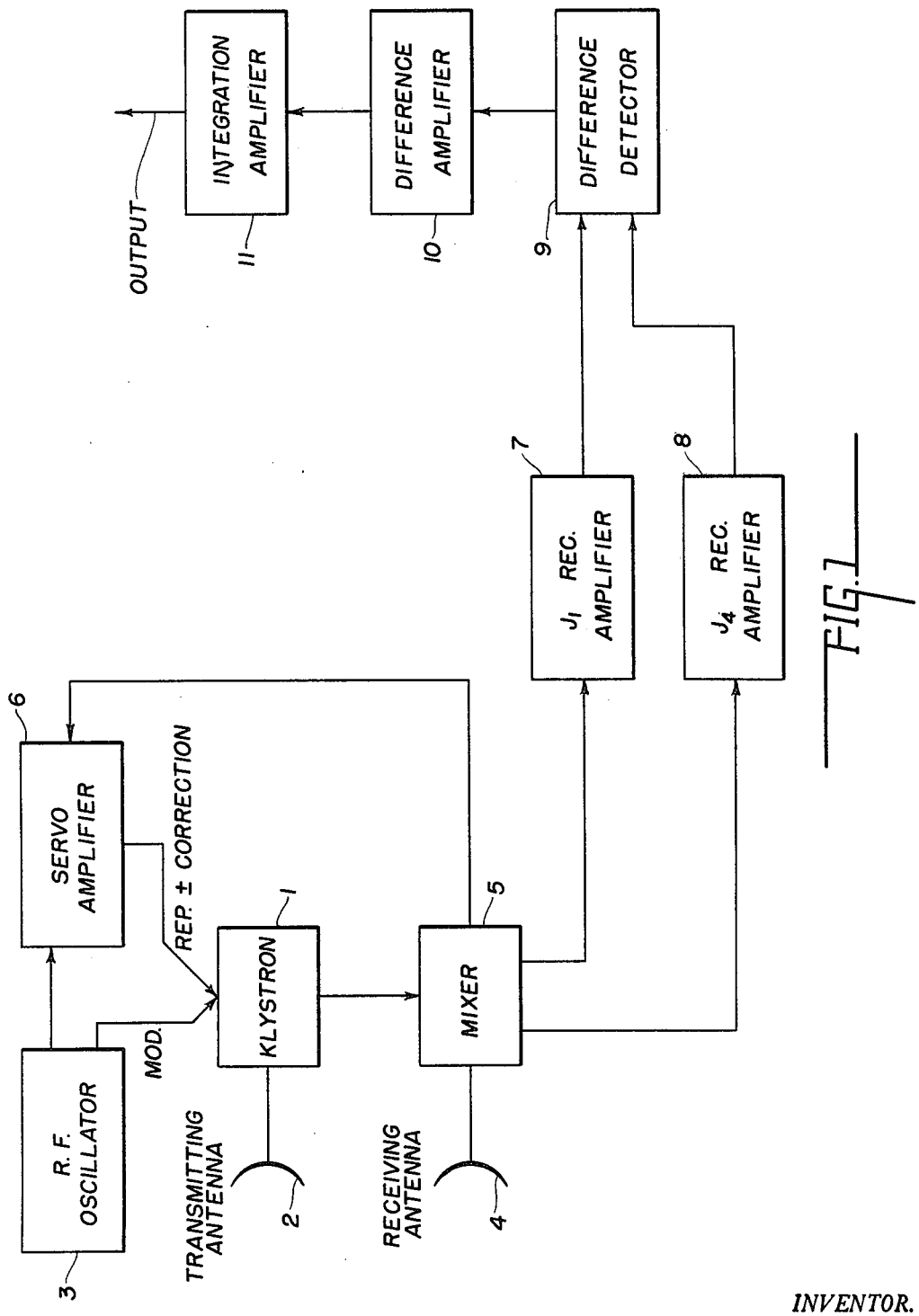

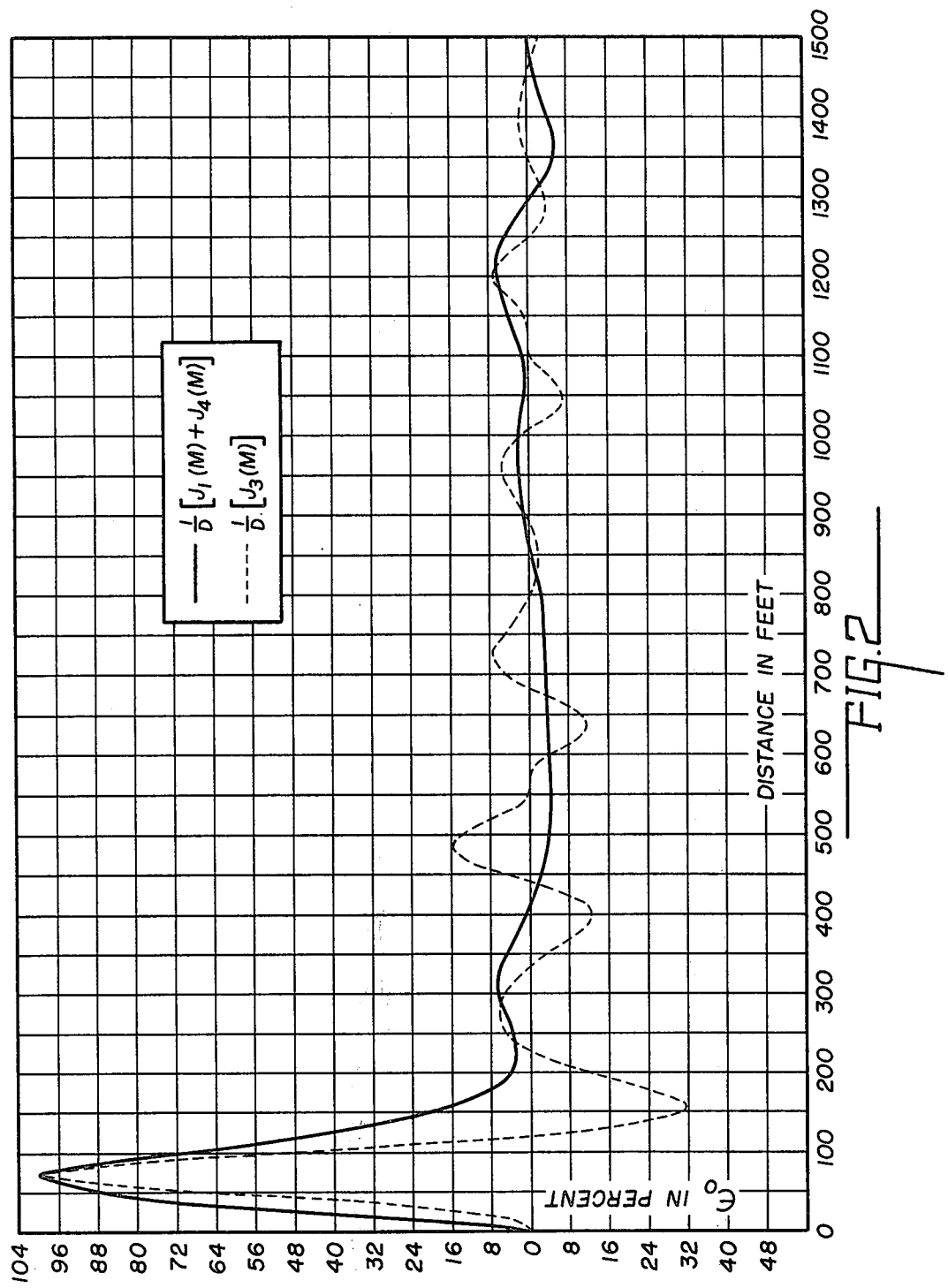

FIRST AND FOURTH HARMONIC SYSTEM

This invention relates to radar systems and is particularly directed to a radar system for effectively distinguishing between two echo signals received from reflecting objects at different ranges.

Except for range gates for excluding all signals from targets outside a specified range, and except for conventional radar range measuring circuits, there is no known phenomena for distinguishing between echo signals of like amplitude from near and far objects. Echo signals from distinct objects below the horizon are often concealed in the signals from the sea or ground. Proximity fuses, for example, are generally ineffective against targets below about 1000-foot altitude.

The object of this invention is an improved radar system for effectively responding to echo signals within a predetermined range while cancelling signals from more distant objects and/or ground.

The objects of this invention are attained by a radar system having a transmitter for directionally radiating a phase modulated carrier, and a receiver with two parallel amplifiers for the received echo signal. The two amplifiers are each provided with band-pass filters adapted to selectively pass, respectively, the first and fourth harmonic components of the received signal. The separately amplified components are then vectorially added so that out-of-phase components of the two harmonics approximately cancel. It is found that the two signals, resulting from targets within a predetermined minimum range, are in phase and are additive while the two signals resulting from targets at a distance greater than said range are substantially subtractive.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a block diagram of the system embodying this invention; and

FIG. 2 is a graph of the response characteristics of the receiver of this invention plotted against range in feet.

The continuous wave carrier generator 1 feeds ultrahigh frequency or microwave energy to the antenna 2. This generator, in the example shown, is a Klystron. The antenna is directional and is designed with the beam width best adapted to the use for which the system is to be used. The carrier frequency is phase modulated by the modulation generator 3.

The return or echo signals are received by antenna 4 which comprises a separate structure as shown. The incoming wave is mixed with a small portion of the output of the carrier generator in mixer 5, containing a conventional magic T mixer, and a crystal detector. The R-F oscillator 3 provides radio frequency modulation to the Klystron and by means of a voltage doubler and detector circuit provides the required direct current repeller voltage to the Klystron. The repeller voltage is servo controlled by servo amplifier 6. A part of the R-F modulation voltage is fed back from the mixer 5 output to the servo amplifier and compared to the R-F voltage at the repeller detector. Any Klystron drift from mode center operation results in a corrective voltage to be applied from the servo amplifier to cause the repeller voltage to change in the correct direction to keep the Klystron on its center frequency.

The modulation components derived by the mixer are fed in parallel to the two low frequency amplifiers 7 and 8. According to an important feature of this invention, amplifier 7 incorporates frequency-selective circuits which effectively attenuate frequencies above and below the first harmonic, or one side band, of the mixer output.

The other amplifier 8, however, incorporates frequencyselective circuits which attenuate frequencies above and below the fourth harmonic of the mixer output. Preferably, the gains of amplifiers 7 and 8 are separately adjustable so that the relative amplitudes of the two pass bands are adjustable.

The outputs of the amplifiers 7 and 8 are applied to the difference detector 9. Detector 9 may be of any phase comparator which will yield the vectorial sum of the first and fourth harmonic component. After amplification at 10 and integration at 11, the resultant signal may be applied to any utilization circuit, such as a cathode ray display. In the case of a proximity fuse, the integrated output of the system would be applied to a detonating circuit.

The output signal amplitude of the difference detector, $JL(M) + J4(M)$, is plotted, as shown in FIG. 2, against distance in feet between the radar station and a reflecting target, where the modulation frequency is 379 kilocycles per second. In this case, it will be noted that the response peaks at the 75 foot range and deviates from zero but little at ranges greater than 150 or 200 feet. For comparison, the response of the more conventional system employing a single band pass filter centered on the third harmonic, $J3(M)$, of the received echo wave is plotted on the same graph. At 480 feet, for example, the J3 system output is four times the output of the $J1(M) + J4(M)$ system of this invention. The improved distance discrimination of the radar of this invention is apparent.

While I have described above the principles of my invention in connection with specific apparatus, it is to be clearly understood that this description is made only by way of example and not as a limitation to the scope of my invention.

What is claimed is:

1. In a radar system, a transmitter and a receiver, directional antenna means for transmitting radiant energy to and receiving reflected energy from distant objects; said receiver including circuits for selectively attenuating signals reflected from objects different distances from the antenna, said circuits including band-pass filters for separating and selectively amplifying, respectively, the first and fourth harmonics contained in the reflected signal, means for vectorially adding the amplified harmonic components, and utilization circuits coupled to said means for adding.

2. A radar system adapted to distinguish between echo signals received from objects at different ranges comprising a transmitter which includes a carrier generator having an output circuit, means for phase modulating the carrier frequency signal of said generator, a receiver coupled to said output circuit and including a mixer for combining the reflected echo signal with a portion of the signal in the output circuit of the carrier generator, said mixer having an output circuit a first and second band-pass filter coupled to the output circuit of the mixer, the filters being selective, respectively, to the first and fourth harmonic components of the mixer output signal, means for adding the output signals of the filters, and means for utilizing the output signal of said adding means.

3. A radar system comprising a continuous wave transmitter frequency signal which transmits a carrier, a relatively low frequency source coupled to the transmitter for phase modulating the carrier signal, a receiver for receiving an echo signal and coupled to said transmitter, said receiver including a mixer for beating the echo signal with the carrier signal, means for separating and selectively amplifying the first and fourth harmonic components of the mixer output signal, and means for comparing said components.

4. The method of distinguishing between echo signals received from objects at different ranges comprising the steps of transmitting a phase modulated signal, receiving an echo signal of the transmitted signal, mixing the received signal with the transmitted signal, extracting the first and fourth harmonics from the mixed signals, and adding said first and fourth harmonics for obtaining a utilization signal.

* * * * *